United States Patent [19]
Mitsuhashi

[11] Patent Number: 5,274,461
[45] Date of Patent: Dec. 28, 1993

[54] IMAGE PROCESSING APPARATUS WHICH PREDICTS WHEN TO PREPARE FOR IMAGE FORMING OPERATIONS

[75] Inventor: Shunya Mitsuhashi, Tokyo, Japan

[73] Assignee: Canon Kabushiki Kaisha, Tokyo, Japan

[21] Appl. No.: 770,423

[22] Filed: Oct. 3, 1991

[30] Foreign Application Priority Data

Oct. 9, 1990 [JP] Japan .................................. 2-269467

[51] Int. Cl.⁵ .......................... B41J 29/38; B41J 2/44; G03G 15/00; G03G 15/20
[52] U.S. Cl. .............................. 358/296; 346/153.1; 355/285; 395/116
[58] Field of Search ...................... 346/160, 160.1, 1.1, 346/153.1; 395/116, 107; 358/296, 300

[56] References Cited

U.S. PATENT DOCUMENTS

| | | | |
|---|---|---|---|
| 4,279,002 | 7/1981 | Rider | 358/257 |
| 4,589,764 | 5/1986 | Tadokoro et al. | 346/160 |
| 4,771,340 | 9/1988 | Notermans | 358/296 |
| 4,786,923 | 11/1988 | Shimizu | 346/160 |
| 4,843,405 | 6/1989 | Morikawa et al. | 346/1.1 |
| 4,933,772 | 6/1990 | Ikenoue et al. | 358/300 |

*Primary Examiner*—Joan H. Pendegrass
*Attorney, Agent, or Firm*—Fitzpatrick, Cella, Harper & Scinto

[57] ABSTRACT

An image processing apparatus includes an input unit for inputting coded data from an external apparatus. A developing unit develops the coded data into bit map data, an output unit outputs the bit map data to a printing unit, and a unit predicts a time needed for developing coded data for one page into bit map data. The predicting unit transmits a timing signal for starting preparatory operations by the printing unit with a timing based on the predicted time.

17 Claims, 10 Drawing Sheets

| COMMAND | COMMAND CODE | PROCESSING TIME |
|---|---|---|
| RESET | ESC c | 100 [msec] |
| SET MARGIN | CSI t | 140 [msec] |
| MOVE ABSOLUTE | CSI f | 50 [msec] |
| ⋮ | ⋮ | ⋮ |
| RASTER GRAPHICS | CSI r | 40 [msec/byte] |

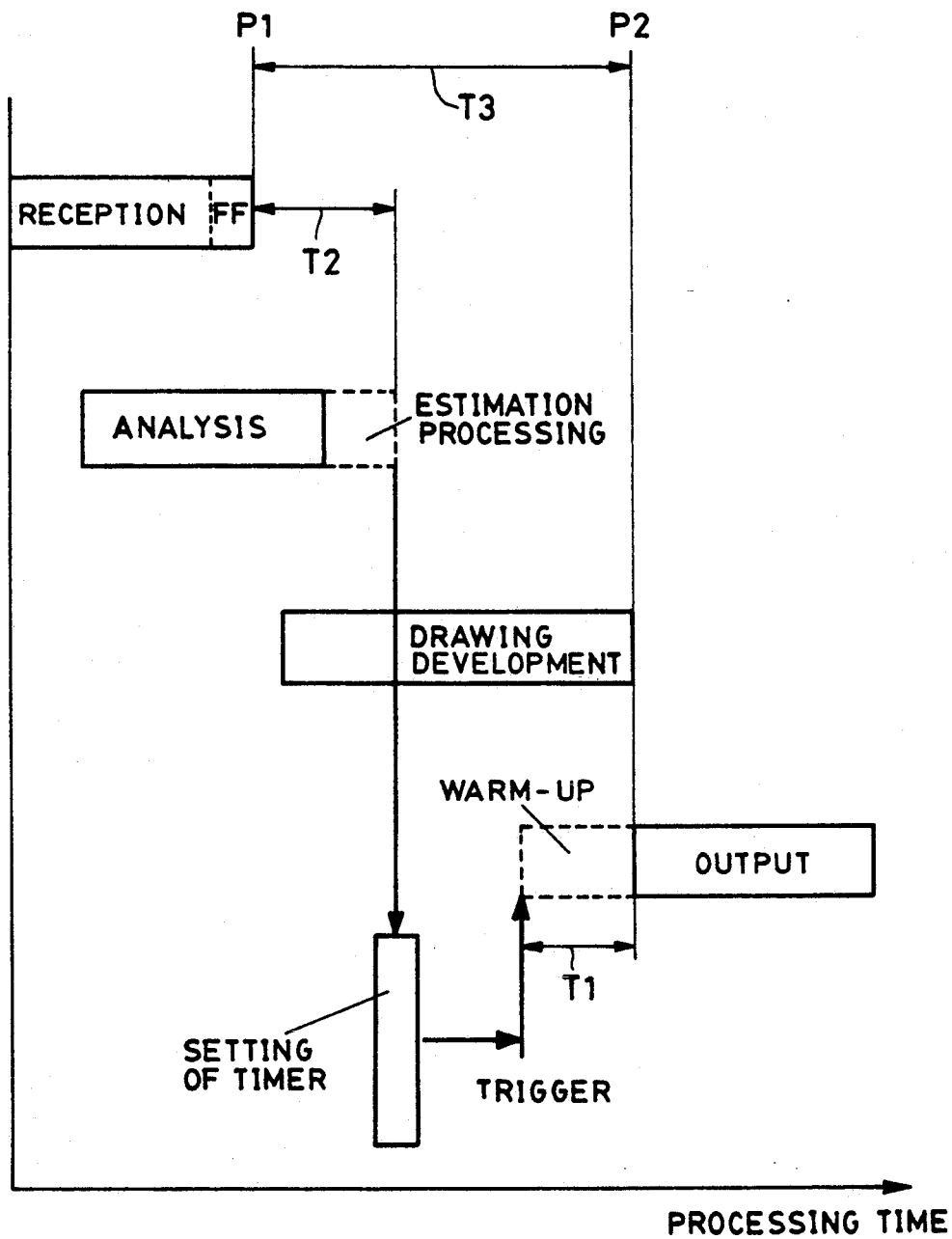

FIG. 8

GENERAL FORM OF INTERMEDIATE CODE

| COMMAND | PRINTING POSITION | PARAMETERS |
|---|---|---|

FIG. 9(a)

INTERMEDIATE CODE FOR CHARACTER PRINTING

| CHARACTER PRINTING COMMAND | PRINTING POSITION | TYPEFACE NUMBER | POINT SIZE | NUMBER OF CHARCTERS | CHARACTER CODE |
|---|---|---|---|---|---|

FIG. 9(b)

INTERMEDIATE CODE FOR IMAGE DRAWING

| IMAGE COMMAND | PRINTING POSITION | IMAGE SIZE | WIDTH | POINTER FOR DATA |
|---|---|---|---|---|

FIG. 9(c)

INTERMEDIATE CODE FOR FIGURE DRAWING

| CIRCLE COMMAND | PRINTING POSITION (RADIUS) | RADIUS |
|---|---|---|

| LINE COMMAND | PRINTING POSITION (START POINT) | PRINTING POSITION (END POINT) |
|---|---|---|

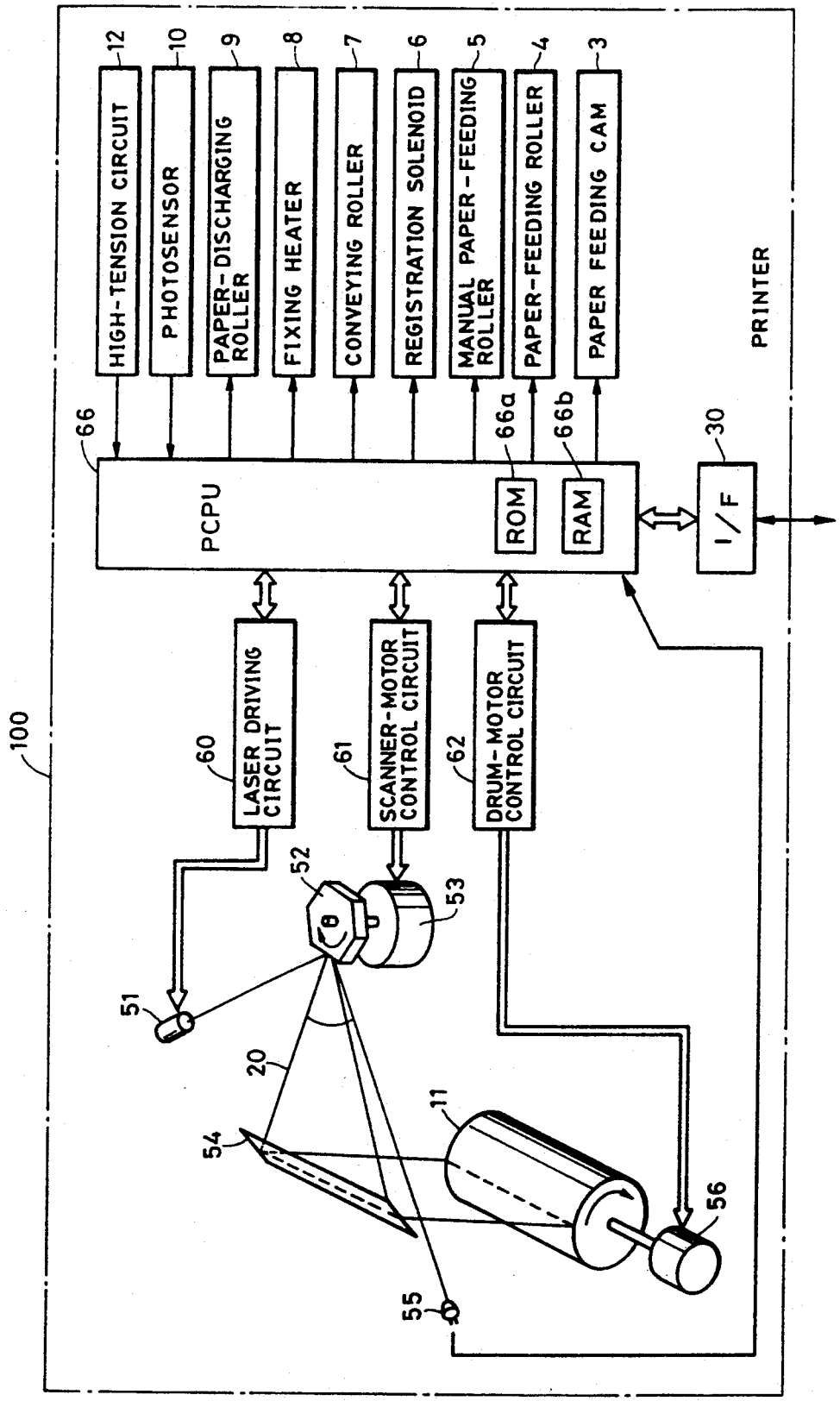

IMAGE PROCESSING APPARATUS WHICH PREDICTS WHEN TO PREPARE FOR IMAGE FORMING OPERATIONS

BACKGROUND OF THE INVENTION

1. Field of the Invention

This invention relates to an image processing apparatus for processing printing information from a host computer or the like, and more particularly, to an image processing apparatus which receives coded printing information, generates a pixel dot pattern (bit map data), and performs printing using a printing unit.

2. Description of the Related Art

In a printing unit of this kind, particularly a laser-beam printer, it is in some cases necessary to perform warm-up operations of respective mechanical units. For example, such operations include stabilization of the revolution speed of a polygon mirror, stabilization of the temperature of a fixing unit, and the like, before starting a printing operation.

FIGS. 1 and 2 are characteristic diagrams showing the starting and transition phases of a conventional warm-up processing. In FIGS. 1 and 2, the ordinate represents the various operational states, and the abscissa represents time.

As shown in FIG. 1, the warm-up processing is started at a timing TM1 when development in bit map data has been terminated. Alternatively, as shown in FIG. 2, when first data has been received from a host computer, that is, at a timing TM2, the warm-up processing for a printer unit is started, thereby increasing the speed of the warm-up processing.

In the above-described conventional approaches, however, a considerable amount of waiting time is needed before printing is initiated. For example, if subsequent data are not input for a certain time period after receiving the first data from the host computer, or if a very long time period is needed for processing the data until all printing data have been received, since warm-up processing for the printer engine is started when the first data has been received, a waiting state is provided while the temperature of a fixing unit is in an operational state, causing a considerable burden on respective units from a viewpoint of power consumption as well as from a viewpoint of life.

SUMMARY OF THE INVENTION

It is an object of the present invention to solve the above-described problems.

It is another object of the present invention to provide a printing unit which can greatly reduce waiting time for the start of printing processing by synchronizing the end of bit map development with the end of warm-up processing by automatically determining the timing of starting the warm-up processing by performing estimating calculation of the time of the end of the bit map development with analyzing printing information input in units of a page.

In the present invention, when printing information is input from a host computer or the like, a calculation means performs estimating calculation of the time of the end of development of printing data in a bit-map memory by analyzing the input printing information. A time to start warm-up is set according to the calculated time of the end of the development of the printing data. It is thereby possible to synchronize the time of the end of the development of the printing data in the bit-map memory with the time to start warm-up.

According to one aspect of the present invention an image processing apparatus is provided with an input circuit for inputting coded data from an external apparatus. The coded data is then developed into bit map data which is outputted to a printing unit. A predicting circuit predicts the time needed for developing the coded data for one page into the bit map data. The predicting circuit transmits the timing signal for starting preparatory operations by the printing unit based on the predicted time.

BRIEF DESCRIPTION OF THE DRAWINGS

FIG. 4 is a schematic diagram illustrating an example of the processing time control table shown in FIG. 3;

FIG. 7 is a diagram illustrating the start and transition phases of warm-up processing in a second embodiment of the present invention;

FIG. 8 is a diagram showing the general form of an intermediate code in the second embodiment;

FIGS. 9(a)-9(c) are diagrams showing examples of respective intermediate codes in the second embodiment;

FIG. 11 is a diagram showing the configuration of an example of a printer engine to which the present invention is applied.

DETAILED DESCRIPTION OF THE PREFERRED EMBODIMENTS

Preferred embodiments of the present invention will now be explained with reference to the attached drawings.

First Embodiment

Figure 1:
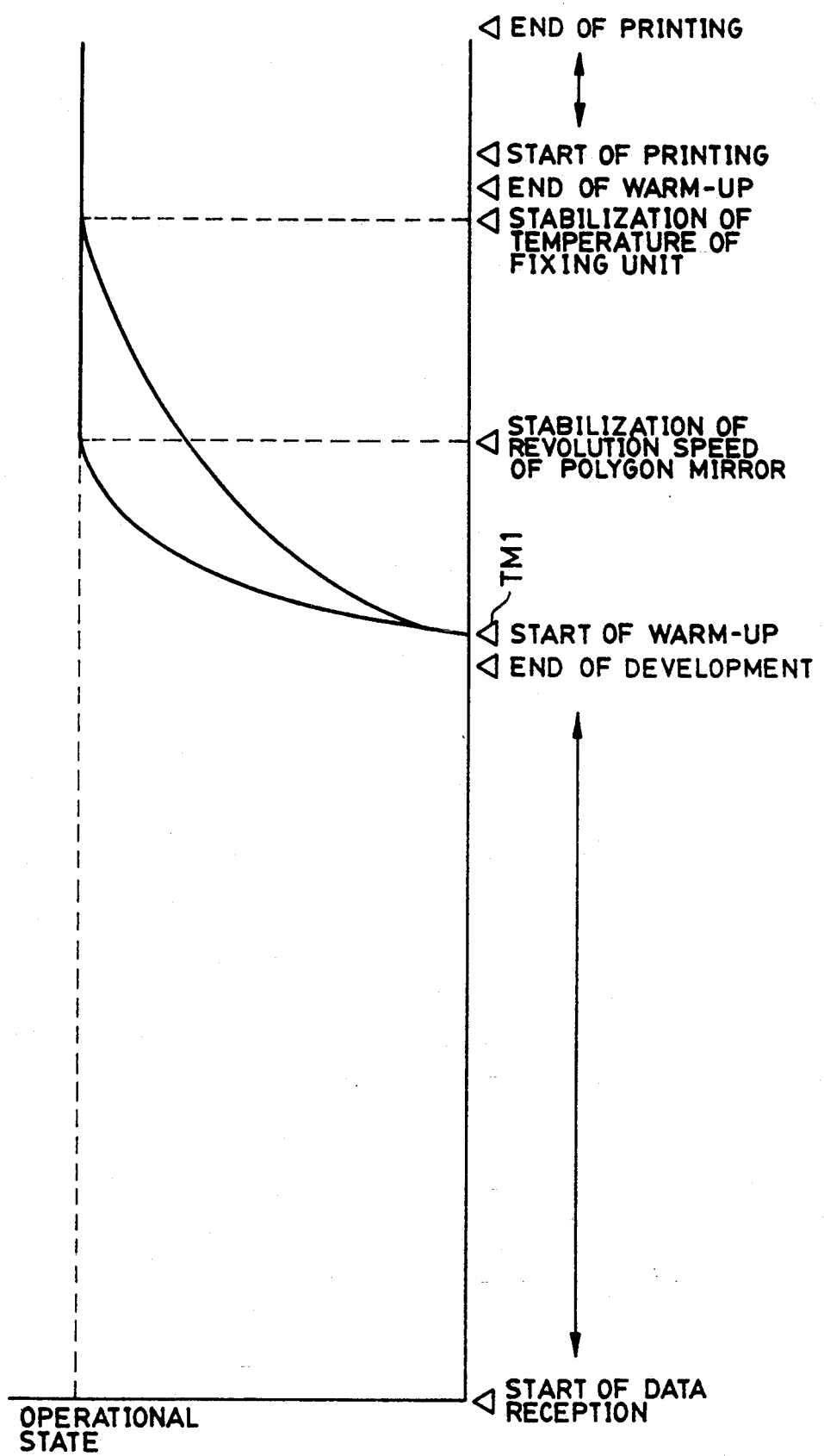
FIGS. 1 and 2 are characteristic diagrams showing the start and transition phases of conventional warm-up processing.
Figure 2:
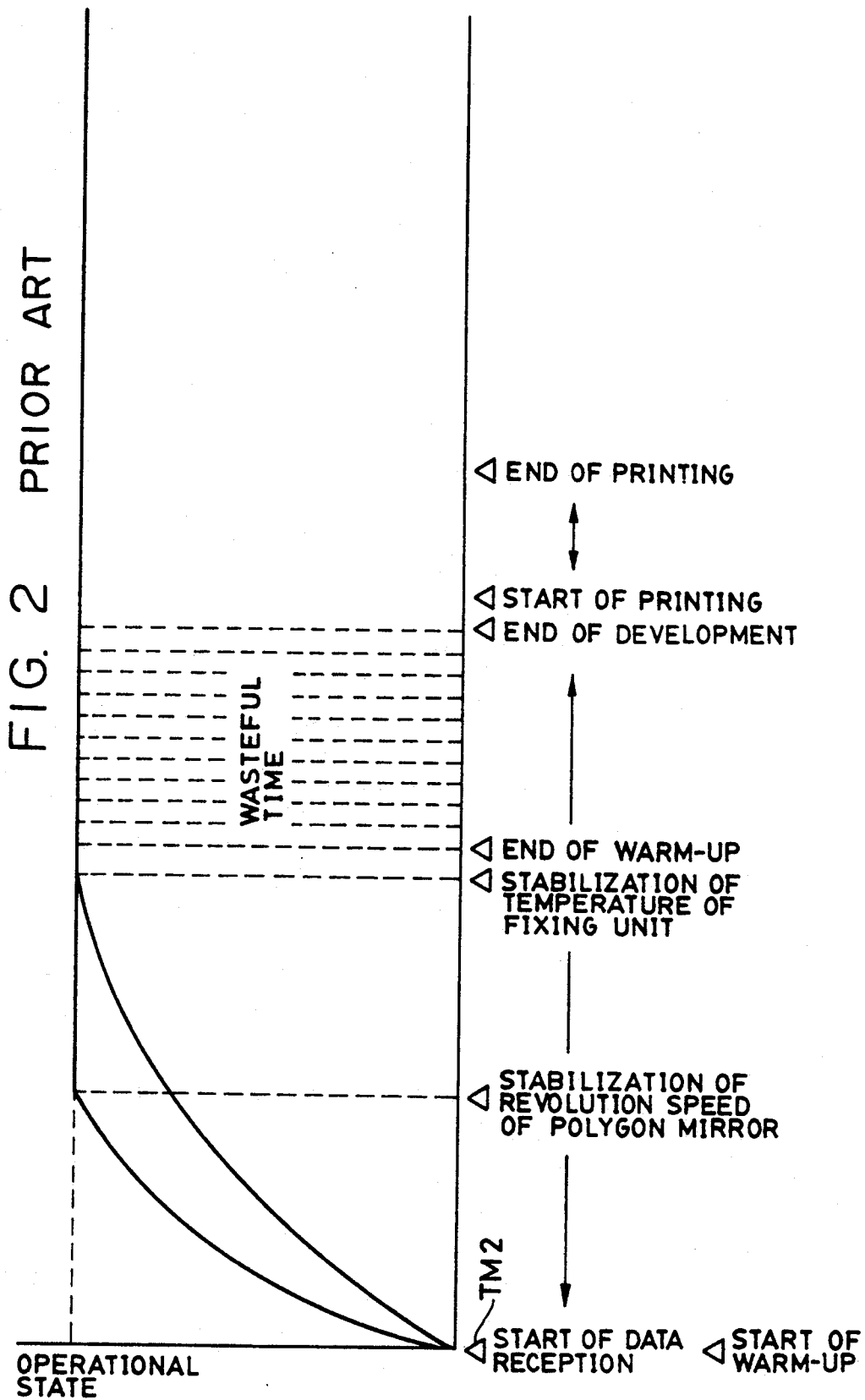
Figure 3:
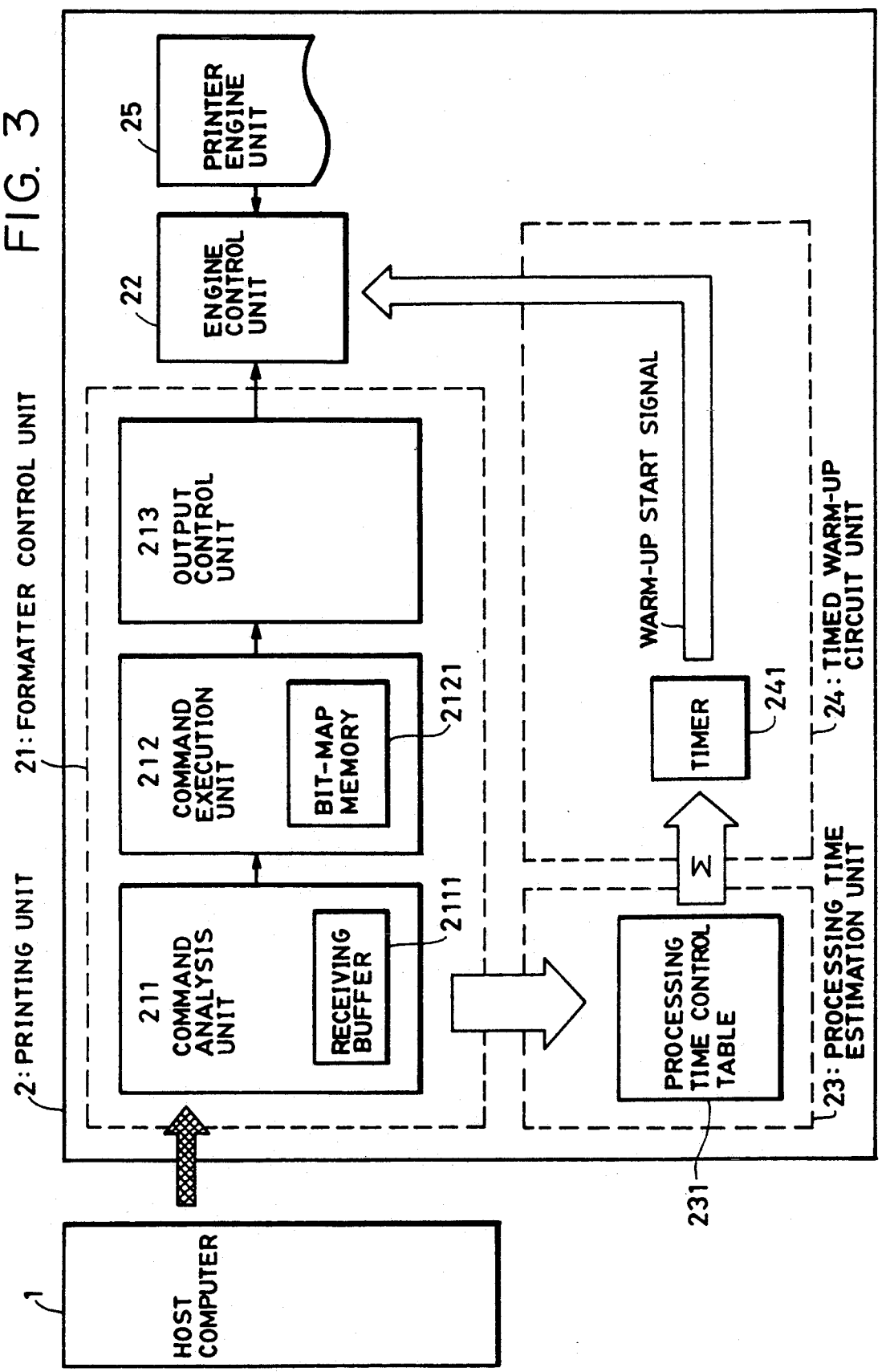
FIG. 3 is a block diagram illustrating the configuration of a printing unit according to an embodiment of the present invention.

FIG. 3 is a block diagram illustrating the configuration of a printing unit according to a first embodiment of the present invention. In FIG. 3, a host computer 1 outputs printing information comprising, for example, printing data and control codes to a printing unit 2. The printing information is described in, for example, a page description language.

The printing unit 2 comprises a formatter control unit 21, an engine control unit 22, a processing time estimation unit 23, a timed warm-up circuit unit 24 and a printer engine unit 25.

The formatter control unit 21 first stores the printing information received from the host computer 1 in a receiving buffer 2111, analyzes the printing information in a command analysis unit 211, and integrates processing times for respective commands while referring to a processing time control table 231.

The analyzed commands are executed by a command execution unit 212. Commands relating to drawing are sequentially developed in a bit-map memory 2121. An output control unit 213 outputs the contents of the bit-map memory 2121 to a printer via the engine control unit 22.

The engine control unit 22 exchanges various kinds of statuses with the printer engine unit 25, and controls a printing operation in accordance with the operational state of the printer engine.

The processing time estimation unit 23 functions as a calculation means in the present embodiment, and includes the processing time control table 231 shown in FIG. 4. The processing time estimation unit 23 sets a time obtained by subtracting a previously-known warm-up time for the printer engine from a processing time calculated while referring to the processing time control table 231 in a timer 241.

The printer engine unit 25 is a printing mechanism unit for forming a permanent visible image of the result developed in the bit-map memory 2121 on recording paper according to the printing information received from the host computer 1, and the like.

In the printing unit having the above-described configuration, when printing information is input from the host computer 1 or the like, a calculation means (the processing time estimation unit 23 in the present embodiment) performs estimating calculation of the time of the end of development of printing data in the bit-map memory 2121 by analyzing the input printing information. A time setting means (the timed warm-up circuit unit 24 in the present embodiment) sets a desired time to start the warm-up by the timed warm-up means according to the calculated time of the end of development of printing data. Thus, the time of the end of development of printing data in the bit-map memory 2121 is synchronized with the time to start the warm-up. After the end of development of printing data, the printing unit is immediately set in a state of being capable of performing printing processing.

FIG. 4 is a schematic diagram illustrating an example of the processing time control table 231 shown in FIG. 3. In FIG. 4, command codes are defined for respective commands, and respective processing times are individually set.

Figure 5:
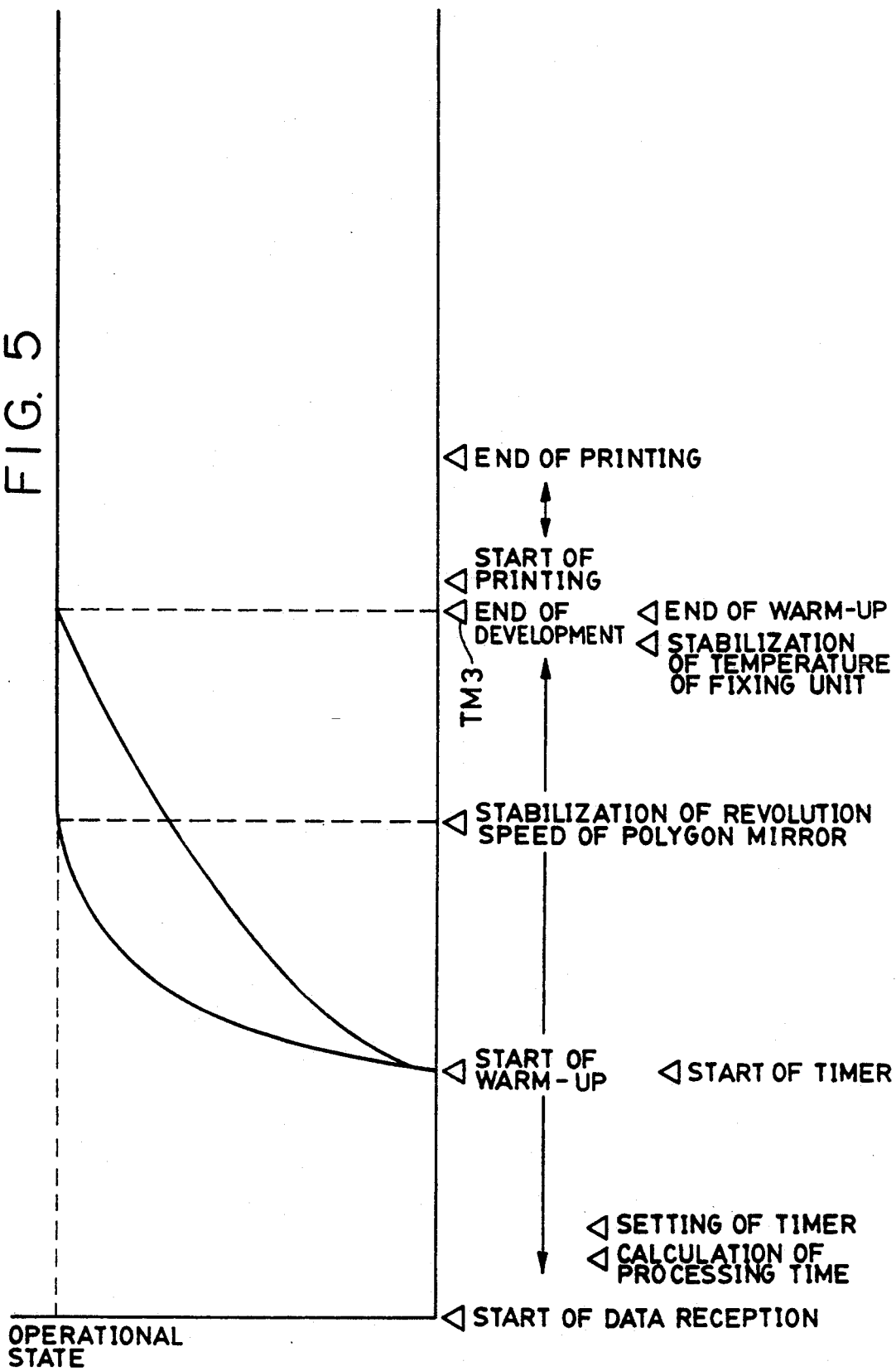
FIG. 5 is a characteristic diagram showing the start and transition phases of warm-up processing in the printing unit of the present invention.

FIG. 5 is a characteristic diagram showing the start and transition phases of warm-up processing in the printing unit of the present invention. In FIG. 5, the ordinate represents operational states, and the abscissa represents time.

The processing operation of the processing time estimation unit 23 shown in FIG. 3 will now be explained with reference to a flowchart shown in FIG. 6.

Figure 6:
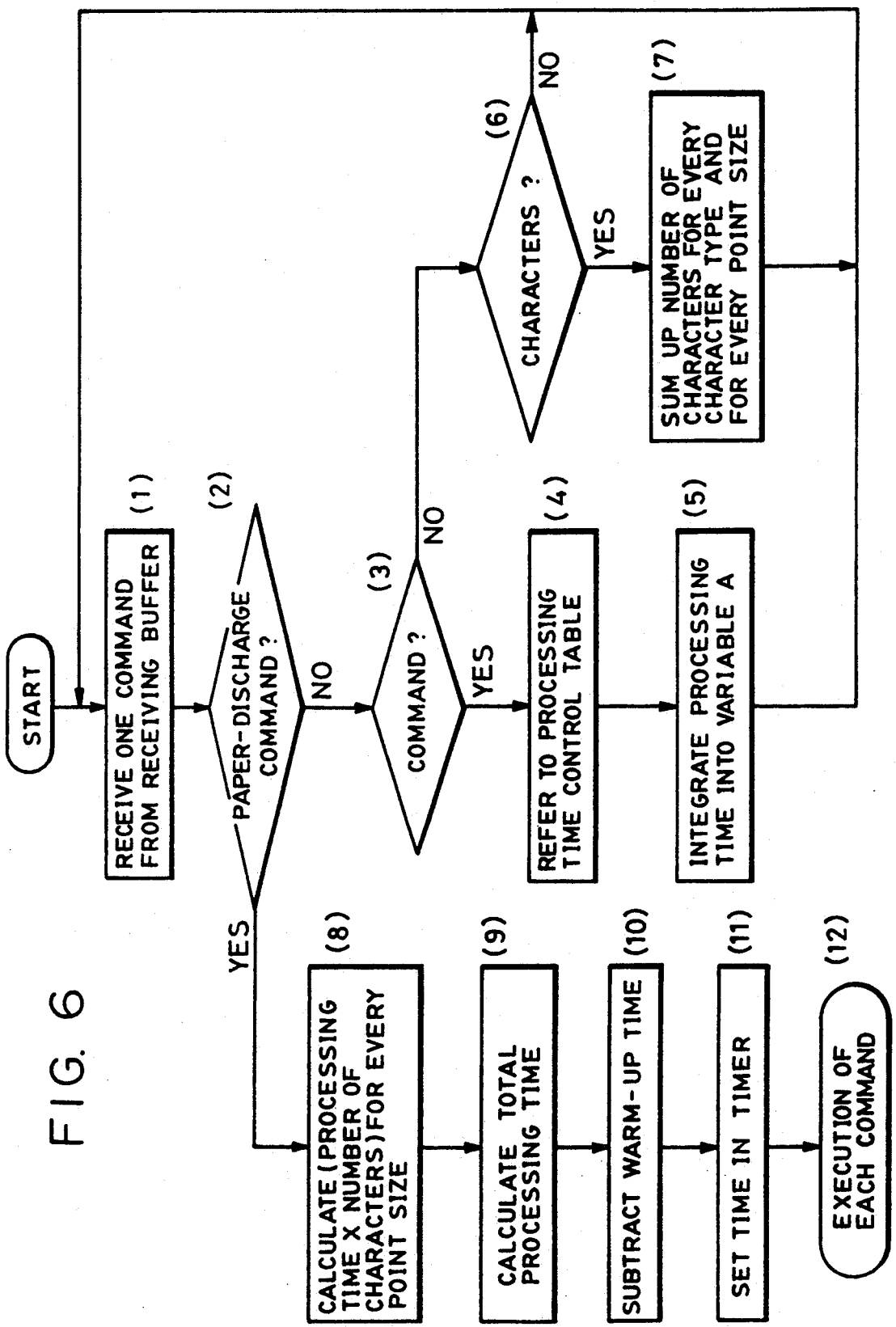
FIG. 6 is a flowchart showing an example of processing procedure by the processing time estimation unit shown in FIG. 3.

FIG. 6 is the flowchart showing an example of processing procedure of the processing time estimation unit 23 shown in FIG. 3. In FIG. 6, numerals (1)–(12) represent the respective steps.

First, a command is received from the receiving buffer 2111 in the command analysis unit 211 (1).

Subsequently, it is determined whether the received command is a paper-discharge command (Form Feed) (2). If the result of the determination is affirmative, the process proceeds to step (8). If the result of the determination is negative, it is determined whether the data comprises a command (3). If the result of the determination at step (3) is affirmative, the processing time control table 231 shown in FIG. 4 is referred to (4). The obtained processing time is integrated into a processing variable A (5), and processing is repeated again from step (1).

If the result of the determination at step (3) is negative, it is determined whether the received data represent characters (6). If the result of the determination is negative, the process returns to step (1). If the result of the determination is affirmative, the total number of characters having respective character types and respective points is summed up by performing counting for every character type and for every point size (7), and the process returns to step (1). In the present embodiment, since the time needed for the above-described development processing greatly differs according to whether the character is a normal character or a special character, the characters are identified.

On the other hand, if the result of the determination at step (2) is affirmative, processing for setting a time in the timer 241 of the timed warm-up circuit unit 24 is performed. First, a value obtained by multiplying a previously-provided processing time in order to develop a character for each character type by the number of characters is calculated based on the summed-up result for respective character types and for respective points, and the sum total is substituted into variable B (8).

Subsequently, the sum total of the previously-obtained variable A and the variable B is obtained as the total processing time (9). The warm-up time for the printer engine 25 is subtracted from the above-described processing time (10), the time obtained at step (10) is set in the timer 241 of the timed warm-up circuit unit 24 (11), and the processing is terminated. The timer 241 of the timed warm-up circuit unit 24 is of subtraction type. The timer 241 starts its operation immediately after the time has been set, and transmits a signal to the engine control unit 22 when the time becomes "0" thus starting the warm-up operation of the printer engine unit 25.

According to the above-described operation, as shown in FIG. 5, the time of the end of warm-up of the printer engine unit 25 coincides with a timing TM3 where development of the printing data in the bit-map memory 2121 is terminated. Hence, it is possible to obtain the most effective printing timing.

Although, in the above-described embodiment, the calculation of the processing time is performed within the printer, this calculation processing may be performed in advance at the side of the host computer. Accordingly, only the result of the calculation may be transmitted to the printer.

When an extended period of time is needed for the processing, power consumption can be further reduced if the entire system is controlled so as to disconnect the power supply for units other than the formatter control unit 21 after the time has been set in the timer 241.

As explained above, the apparatus according to the present invention comprises the timed warm-up means for starting the predetermined warm-up processing for the printer engine at an assigned time, the calculation means for performing estimating calculation of the time of the end of development of printing data in the bit-map memory by analyzing input printing information, and the time setting means for setting the time to start desired warm-up in the timed warm-up means according to the time of the end of development of printing data calculated by the calculation means. Hence, it is possible to always complete the desired warm-up necessary for the printer engine at the time of the end of development of printing data for one page in the bit-map memory. Accordingly, the present invention has the excellent results, for example, of reduced power consumption, increased life of respective units of the printer engine, such as the fixing unit and the like, and shortened first printing time.

Second Embodiment

In the first embodiment, the time for development for one page is estimated by integrating times for development of attributes and the like of characters for printing data (character codes), and integrating processing times for respective control commands. An explanation will now be provided of a second embodiment wherein a time for development for one page is estimated with higher accuracy.

FIG. 7 illustrates an outline of respective processing times in the formatter control unit 21. In FIG. 7, the abscissa represents time. Since the configuration of the second embodiment is the same as that of the first embodiment, an explanation of the configuration will be omitted. In the present embodiment, respective processes within the printing unit are operated by multitasked processing, for example, data analysis processing is performed while receiving printing data, and development processing in the bit map is performed during data analysis processing, as shown in FIG. 7.

In the present embodiment, the processing time estimation unit estimates a time period T3 from time P1, where an FF (Form Feed) code, serving as a paper-discharge command for the printing unit, is recognized in reception processing, to time P2 where drawing development processing in the bit map is completed. Accordingly, such a unit sets a value obtained by subtracting warm-up time T1 for the engine (and already-lapsed time T2 if necessary) from the time period T3 to the timer.

If any unanalyzed data are present at time P1, analysis processing of the data is first performed. In the analysis processing, an intermediate code having a form so that drawing development processing can be easily performed from received data is generated. FIG. 8 shows the general form of the intermediate code. Basically, recording information, such as what (command), where (printing position), how (parameters), and the like, is described in the intermediate code.

When the analysis processing for one page is completed, all data to be developed in that page are represented in the form of intermediate codes. Since the drawing processing unit performs development processing according to the intermediate codes, the drawing processing unit can estimate the time of the end of drawing development processing according to unprocessed intermediate codes when the time is estimated. An explanation will now be provided of a specific method of the time estimation.

FIGS. 9(a)-9(c) illustrate examples of intermediate codes. FIG. 9(a) illustrates an example of an intermediate code for character printing, FIG. 9(b) illustrates an example of an intermediate code for image drawing, and FIG. 9(c) illustrates an example of an intermediate code for figure drawing. The intermediate code for character printing describes a typeface number indicating a typeface to be printed, a point size indicating the size of characters, the number of characters to be printed, a character code and the like as parameters, in addition to a character printing command and printing positions.

The intermediate code for image drawing includes as parameters an image size indicating the size of image data, the number of pixels in the lateral width of the image data, a pointer for a memory where the actual image data are stored, and the like. Various kinds of images are present, such as a binary black-and-white image, a multivalue gray-scale image having gradations, a multicolor image and the like. Such an image is identified in an image command portion.

The form of the intermediate code for figure drawing differs according with each figure. Identification of each figure is performed in a command portion. For example, in drawing a circle, the coordinates of the center of the circle are provided as the printing position, and the radius of the circle is provided as the parameter. In drawing a line, the start point of the line is provided as the printing position, and the coordinates of the end point of the line are provided as a parameter.

An explanation will now be provided of a method of estimating the time for drawing development according to intermediate codes having the above-described configuration.

It is assumed that the number of estimation processes for the time for drawing development equals the number of commands in intermediate codes.

Figure 10:
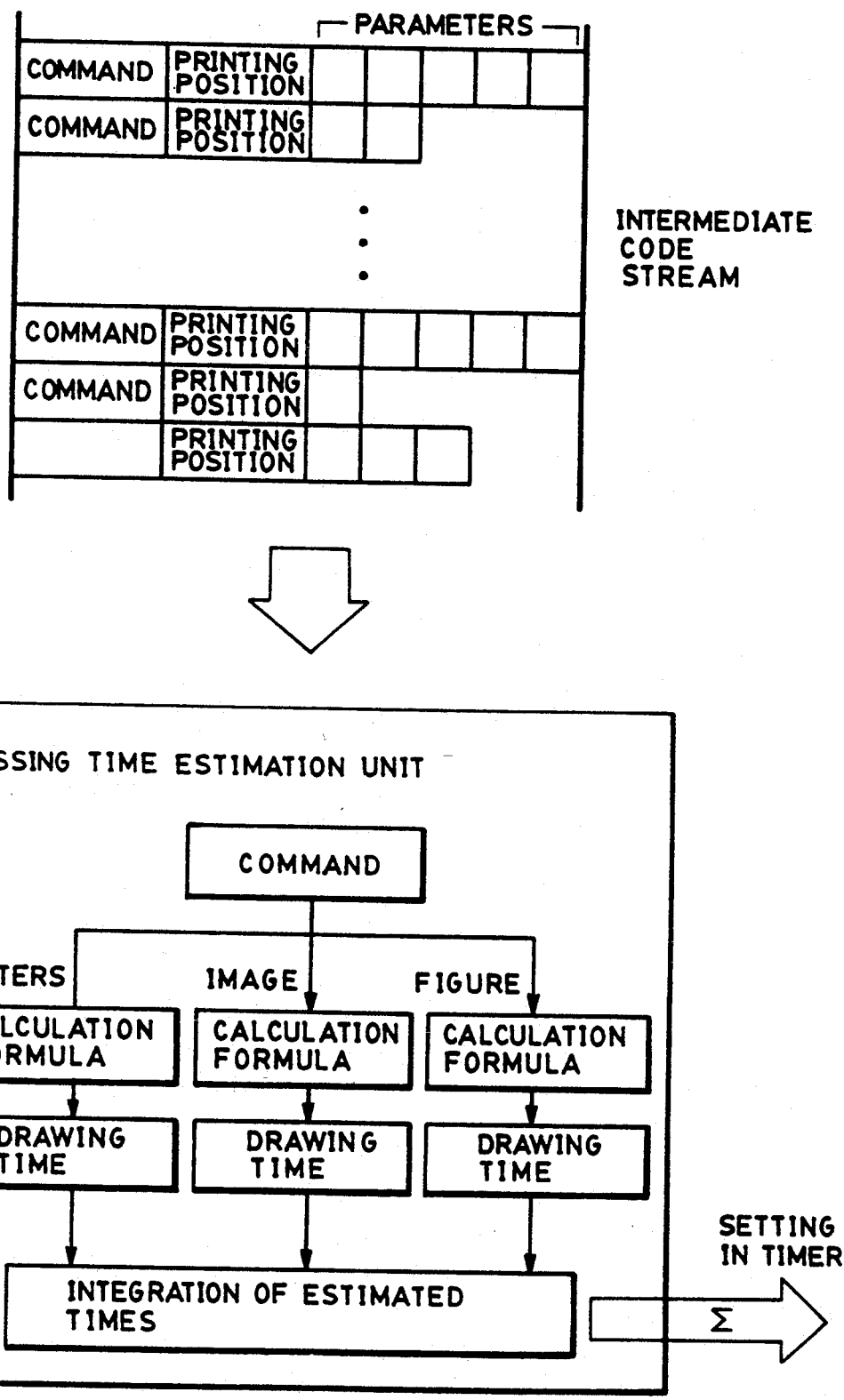
FIG. 10 is a diagram showing a configuration for estimating a processing time from intermediate codes.

That is, parameters and other conditions of an intermediate code are put in an expression for calculating an estimated time for each command of the intermediate code in order to estimate a time for drawing development (see FIG. 10).

For example, when an intermediate code for character printing is received, a time for developing a bit-map font is calculated using an approximate expression (point size) $\times \alpha + \beta$ indicating the relationship between the point size and the time for development previously obtained for each typeface. If the font is already present in a font cache, or is present as a bit-map font, the time for development is estimated to be 0. Subsequently, the time for drawing in a page memory is calculated using an approximate expression (point size) $\times \alpha + \beta$ indicating the relationship between the point size and the time for drawing in the same manner as in calculating the time for development. The processing time for one character is obtained by adding the time for development and the time for drawing. One intermediate code for character printing is processed by multiplying the obtained processing time by the number of characters.

When an intermediate code for image drawing is received, the time for drawing is calculated by multiplying a coefficient $\alpha$ for the time for drawing per pixel previously calculated for each kind of the image command by the image size.

Also when an intermediate code for figure drawing is received, the time for drawing is calculated by substituting respective parameters into an expression for calculating the time for drawing previously calculated for each figure in the same manner as in the case of the image command. For example, in the case of a circle, in addition to the radius used as a parameter, the values of the line width and the kind of the line defined by other commands are used as parameters. It is possible to calculate the time for drawing the circle using an expression (the radius) $\times \alpha +$ (the line width) $\times \beta +$ (the number of the kind of the line) $\times \gamma$, where $\alpha$, $\beta$ and $\gamma$ represent coefficients for respective time for drawing.

A time obtained by subtracting the time necessary for warm-up of the engine from a value obtained by integrating the respective times for drawing development obtained as described above is set in the timer.

When the time set in the timer has lapsed, a trigger signal is output to the engine control unit as a warm-up start signal, and warm-up operations are started.

Warm-up operations in the printer engine will now be explained illustrating a laser-beam printer with reference to FIG. 11.

Warm-up operations to be performed by the laser-beam printer before the end of development after receiving printing information comprise turning on a fixing heater 8, driving a scanner motor 53, confirmation of a normal output of BD signal by a BD sensor 55, controlling the amount of the light beam, driving a paper-feeding cam 3, paper-feeding rollers 4 and 5 for feeding paper to a registration position, driving a drum motor 56 and a high-tension circuit 12 in order to provide a uniform surface potential of a photosensitive drum 11, and the like. Usually, when these warm-up operations are terminated, a PCPU 66 outputs a VSREQ signal via an I/F 30. The formatter control unit (FIG. 3) has completed development for one page and has received the VSREQ signal outputs bit-map data in synchronization with a VSYNC signal.

Operations, such as turning on a registration solenoid 6, driving a conveying roller 7, driving a paper-discharging roller 9, and the like, are performed in synchronization with the VSYNC signal. At the same time, the bit map data are supplied to a laser driving circuit 60 to modulate the laser beam 201 from a semiconductor laser 51. The laser beam 201 is deflected by a polygon mirror which has already been rotatably driven and scans the surface of the photosensitive drum 11 as reflected by a mirror 54 to form an electrostatic latent image on the surface of the photosensitive drum 11. The surface potential of the photosensitive drum 11 becomes uniform by a primary charger (not shown) to which a high voltage is applied by the high-tension circuit 12. The electrostatic latent image on the photosensitive drum 11 is subjected to toner development by a developing unit (not shown). The obtained toner image is transferred onto paper by a transfer unit (not shown), and is subjected to thermal fixing by the fixing heater 8. The paper having the fixed image is discharged outside the apparatus by the paper-discharging roller 9.

In the present embodiment, the above-described respective warm-up operations are started according to reception of the above-described timing signal. Usually, the longest time is needed for increasing the temperature of the fixing heater 8 to a predetermined fixing temperature. Hence, the fixing heater 8 is first turned on, and the above-described warm-up operations are then sequentially performed. When using, for example, a fixing unit which can very quickly reach a state of being capable of performing a fixing operation, the scanner motor 53 may be first driven by a scanner-motor control circuit 61, or the fixing heater 8 and the scanner motor 53 may be simultaneously turned on, after receiving the trigger signal.

A program for controlling the above-described warm-up operations is stored in a ROM 66a in the PCPU 66. A RAM 66b is used, for example, as a work area for executing the program.

The present invention is not limited to the above-described embodiments, but various changes and modifications may be made within the scope of the appended claims. For example, the first and second embodiments may be combined together. Alternatively, the warm-up operations may be started when printing information is received, the warm-up operations may be interrupted if the estimated time for development exceeds a predetermined time, and the warm-up operations may be resumed with being adjusted with the time of the end of development. In such a case, it is possible to very quickly start a printing operation if the time for development is very short. The above-described warm-up start signal may not be a trigger signal, but may be a data signal representing and estimated time. Furthermore, the printing information may not necessarily have the above-described form, but may, for example, comprise Post Script (a registered trade-mark). Warm-up operations may comprise one or a plurality of the above-described operations. When a printer engine other than the laser-beam printer is used, operations corresponding to that particular printer engine must be performed. Bit map data output to the printer engine may be data subjected to compression processing, such as Huffman coding and the like.

What is claimed is:

1. An image processing apparatus comprising:
    input means for inputting coded data from an external apparatus;
    developing means for developing the coded data into bit map data;
    output means for outputting the bit map data to a printing unit, wherein the printing unit performs a printing operation including an electrophotographic method and comprises fixing means for fixing an image formed on a recording medium; and
    predicting means for predicting a time needed for developing the coded data for one page into a bit map data,
    wherein said predicting means transmits a timing signal for starting preparatory operations including an operation for setting said fixing means at a predetermined temperature, based on the predicted time.

2. An image processing apparatus according to claim 1, wherein said predicting means comprises a timer in which a value of the predicted time is set, and outputs the timing signal when a count value by the timer reaches the set value.

3. An image processing apparatus according to claim 1, wherein said predicting means transmits data representing the predicted time as the timing signal.

4. An image processing apparatus according to claim 1, wherein said apparatus starts the preparatory operations of the printing unit in synchronization with the input of the coded data, and wherein said predicting means interrupts the preparatory operations of the printing unit when the predicted time exceeds a predetermined time, and transmits a timing signal for resuming the preparatory operations.

5. An image processing apparatus according to claim 4, wherein the printing unit performs a printing operation comprising an electrophotographic method, and wherein the preparatory operations include a rotation driving operation of a photosensitive drum.

6. A method for controlling plural warm-up operations of a printing unit, said method comprising the steps of:
    inputting printing information for one page;
    starting the plural warm-up operations in response to inputting of the printing information;

calculating a time needed for converting the printing information for one page into bit map data;

outputting a signal for stopping at least one of the warm-up operations in a case where the time needed for conversion is longer than a predetermined time; and outputting a signal for restarting said at least one of the warm-up operations based on the time calculated in said calculation step in a case where the stopping signal was outputted in the stopping signal output step.

7. A method according to claim 6, wherein said restarting signal outputting step includes an operation of counting a time obtained by subtracting a time needed for the warm-up operations from a time needed for converting the printing information for one page into the bit map data.

8. A method according to claim 6, wherein said method is for controlling the warm-up operations of an electrophotographic printing unit, and wherein said at least one of the warm-up operations includes a rotation driving operation of a photosensitive drum.

9. A method according to claim 6, wherein said method is for controlling the warm-up operations of an electrophotographic printing unit comprising deflecting means for deflecting a laser beam modulated by an image signal, and wherein said at least one of the warm-up operations includes an operation for driving said deflecting means in a predetermined state.

10. An image processing apparatus comprising:
input means for inputting coded data from an external apparatus;
developing means for developing the coded data into bit map data;
output means for outputting the bit map data to a printing unit, wherein the printing unit performs a printing operation including an electrophotographic method and comprises generating means for generating a laser beam and deflecting means for deflecting the laser beam; and
predicting means for predicting a time needed for developing the coded data for one page into bit map data,
wherein said predicting means transmits a timing signal for starting the preparatory operations including an operation for driving said deflecting means in a predetermined state, based on the predicted time.

11. An image processing apparatus according to claim 10, wherein said predicting means comprises a timer in which a value of the predicted time is set, and outputs the timing signal when a count value by the timer reaches the set value.

12. An image processing apparatus according to claim 10, wherein said predicting means transmits data representing the predicted time as the timing signal.

13. An image processing apparatus according to claim 10, wherein said apparatus starts the preparatory operations of the printing unit in synchronization with the input of the coded data, and wherein said predicting means interrupts at least one of the preparatory operations of the printing unit when the predicted time exceeds a predetermined time, and transmits a timing signal for resuming said at least one of the preparatory operations.

14. An image processing apparatus according to claim 13, wherein the printing unit performs a printing operation comprising an electrophotographic method, and wherein said at least one of the preparatory operations includes a rotation driving operation of a photosensitive drum.

15. An image processing apparatus comprising:
input means for inputting coded data from an external apparatus;
developing means for developing the coded data into bit map data;
output means for outputting the bit map data to a printing unit, wherein the printing unit performs a printing operation including an electrophotographic method and comprises a rotatable photosensitive drum; and
predicting means for predicting a time needed for developing the coded data for one page into bit map data,
wherein said apparatus starts the preparatory operations including a rotation driving operation of the photosensitive drum in response to input of the coded data, and
wherein said predicting means interrupts the rotation driving operation of the photosensitive drum in a case where the predicted time exceeds a predetermined time, and transmits a timing signal for resuming the rotation driving operation of the photosensitive drum based on the predicted time.

16. An image processing apparatus according to claim 15, wherein said predicting means comprises a timer in which a value of the predicted time is set, and outputs the timing signal when a count value by the timer reaches the set value.

17. An image processing apparatus according to claim 15, wherein said predicting means transmits data representing the predicted time as the timing signal.

* * * * *